T. S. DISSTON.
COMBINED PRUNING SHEARS AND SAW.
No. 188,604. Patented March 20, 1877.
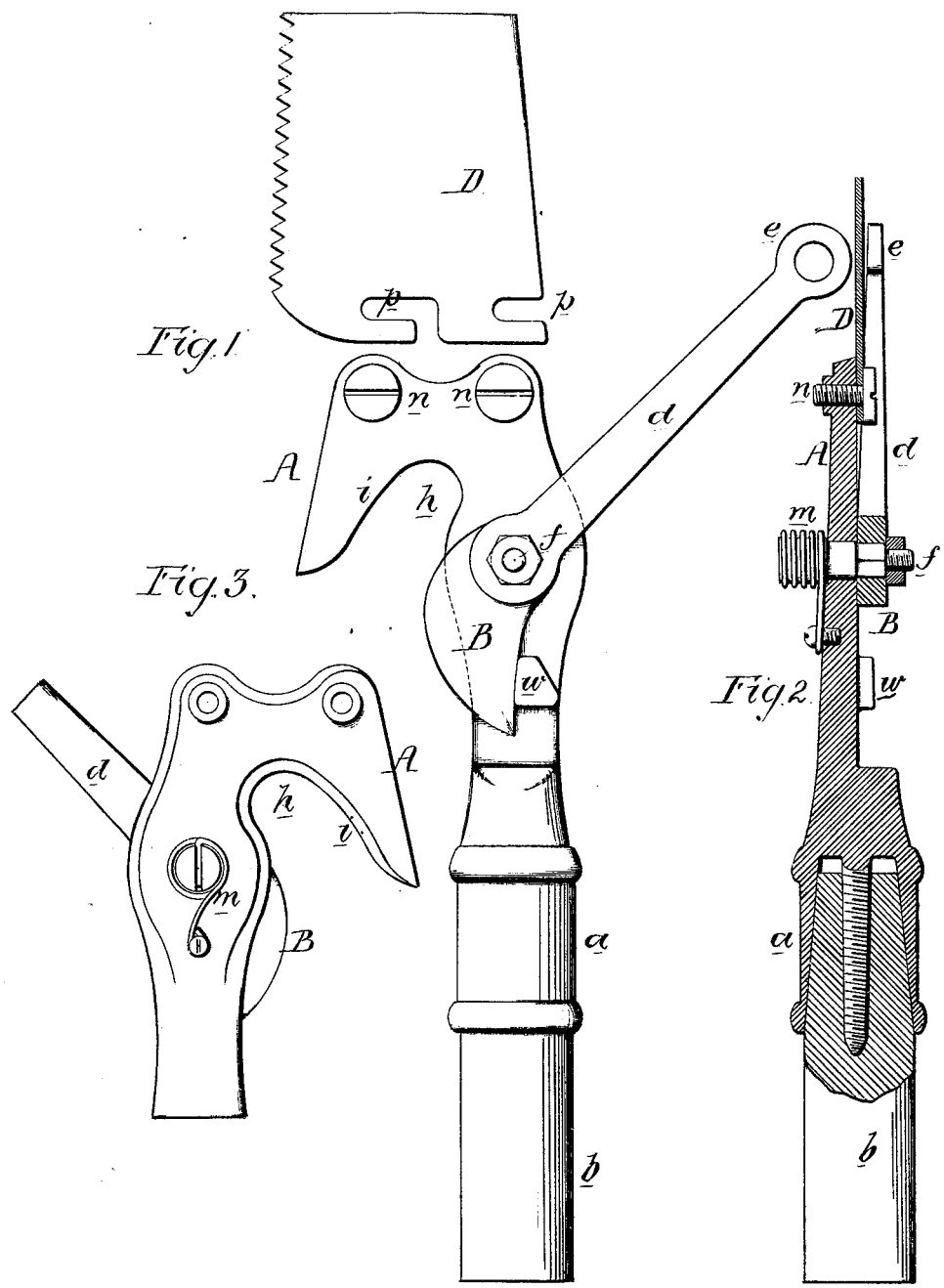

UNITED STATES PATENT OFFICE.

THOMAS S. DISSTON, OF PHILADELPHIA, PENNSYLVANIA, ASSIGNOR TO HENRY DISSTON & SONS, OF SAME PLACE.

IMPROVEMENT IN COMBINED PRUNING SHEARS AND SAW.

Specification forming part of Letters Patent No. 188,604, dated March 20, 1877; application filed February 9, 1877.

*To all whom it may concern:*

Be it known that I, THOMAS S. DISSTON, of Philadelphia, Pennsylvania, have invented a new and useful Improvement in Pruning Shears and Saw Combined, of which the following is a specification:

The object of my invention is to construct a compact and handy pruning implement, which can be readily used for severing branches, either by shearing or sawing.

In the accompanying drawing, Figure 1 is a side view of the implement, showing the saw-blade detached from the shears; Fig. 2, a vertical section, and Fig. 3 a rear view of the shearing device.

The shearing portion of the implement consists of a plate, A, having a socket, $a$, for attachment to the wooden handle $b$, and a knife, B, attached to or forming part of the lever $d$, and pivoted to the said plate by a pin, $f$.

The plate A is converted by a recess, $h$, into a hook, which, in using the implement, is placed over the branch to be severed, the knife B operating in conjunction with the edge $i$ of the plate, and the cutting being effected by manipulating a cord attached to an eye, $e$, at the end of the lever $d$, which, after the cord is released, is restored to the position shown in Fig. 1 by a spring, $m$, coiled around a projecting portion of the pivot-pin $f$, and having one end attached to the plate A, and the other end to the said pin, which is secured to the blade B, and turns freely in the plate A. To this plate is attached the blade D of a saw, which, being part of the implement, can be used to sever such branches as, owing to their thickness or location, cannot be easily clipped off by the shears, the handle $b$ of which may be used as a medium for operating the saw.

The saw is attached to the fixed plate of the shears so as to be detachable, in the manner shown in the drawing, the plate being furnished with two set-screws, $n$ $n$, to the stems of which are adapted two slots, $p$ $p$, in the base of the blade, the screws being tightened after the blade has been adjusted to its place, and loosened when the blade has to be detached for the purpose of sharpening the saw, or for other reasons.

A stop, $w$, on the plate A limits the movement of the blade in both directions, and in the interior of the socket A is a screw for firmly securing the wooden handle in the socket.

I do not desire to claim, broadly, the combination of pruning-shears with a saw; but

I claim as my invention—

The combination, in a pruning implement, of the body A, its edge $i$, and bolts $n$ with the saw D, and with the knife B, its lever $d$, pivot $f$, and spring $m$, as set forth.

In testimony whereof I have signed my name to this specification in the presence of two subscribing witnesses.

THOS. S. DISSTON.

Witnesses:
HENRY HOWSON, Jr.,
HARRY SMITH.